United States Patent
Stein et al.

(10) Patent No.: US 8,070,938 B2
(45) Date of Patent: Dec. 6, 2011

(54) APPARATUS AND METHOD FOR SUPERHEATED VAPOR CONTACTING AND VAPORIZATION OF FEEDSTOCKS CONTAINING HIGH BOILING POINT AND UNVAPORIZABLE FOULANTS IN AN OLEFINS FURNACE

(75) Inventors: Louis Edward Stein, Houston, TX (US); Danny Yuk Kwan Ngan, Houston, TX (US); Arthur James Baumgartner, Houston, TX (US); Karl Gregory Anderson, Missouri City, TX (US); Raul Jasso Garcia, Sr., Houston, TX (US); Richard Rodriguez, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/911,547

(22) Filed: Oct. 25, 2010

(65) Prior Publication Data

US 2011/0036751 A1   Feb. 17, 2011

Related U.S. Application Data

(62) Division of application No. 11/953,678, filed on Dec. 10, 2007, now Pat. No. 7,862,651.

(60) Provisional application No. 60/869,441, filed on Dec. 11, 2006.

(51) Int. Cl.
  *C10C 3/06* (2006.01)

(52) U.S. Cl. ............... 208/130; 208/81; 208/82; 208/83; 208/84

(58) Field of Classification Search .............. 208/81–84, 208/130
See application file for complete search history.

(56) References Cited

U.S. PATENT DOCUMENTS

| | | | | |
|---|---|---|---|---|
| 2,235,329 | A * | 3/1941 | Ocon | 208/80 |
| 3,498,028 | A | 3/1970 | Trouw | 55/237 |
| 3,617,493 | A | 11/1971 | Wirth | 208/80 |
| 4,838,906 | A | 6/1989 | Kiselev | 55/238 |
| 6,376,732 | B1 | 4/2002 | Ngan et al. | 585/800 |
| 6,626,424 | B2 | 9/2003 | Ngan et al. | 261/112.1 |
| 6,632,351 | B1 | 10/2003 | Ngan et al. | 208/132 |
| 2006/0129012 | A1 * | 6/2006 | Frye et al. | 585/648 |

FOREIGN PATENT DOCUMENTS

JP       54033869       4/2002

* cited by examiner

*Primary Examiner* — Robert J Hill, Jr.
*Assistant Examiner* — Brian Mccaig

(57) ABSTRACT

A contactor/separator is formed from a vessel; an inlet for receiving a vapor/liquid mixture; an inlet for receiving a superheated vapor; a hub located within the vessel, the hub including a plurality of vanes for imparting a centrifugal motion to the vapor/liquid mixture or the superheated vapor; an outlet in a bottom of the vessel for removing liquid; and an outlet for removing vapor from the vessel. A method is also provided for heating and separating liquid and vapor from a hydrocarbon feedstock comprising introducing a hydrocarbon feedstock into a contactor/separator: introducing a superheated vapor into the contactor/separator such that it contacts and vaporizes a portion of the feedstock within the contactor/separator; separating unvaporized feedstock from vaporized feedstock in the contactor/separator; removing the vaporized feedstock and the superheated vapor through a first outlet; and removing the unvaporized feedstock through a second outlet.

17 Claims, 8 Drawing Sheets

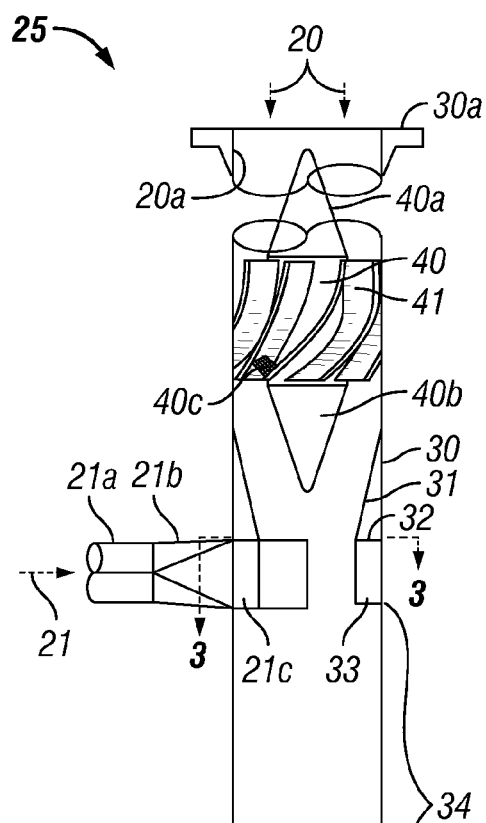
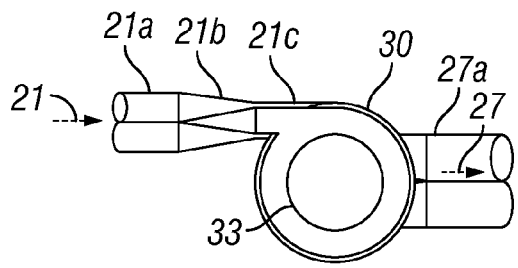
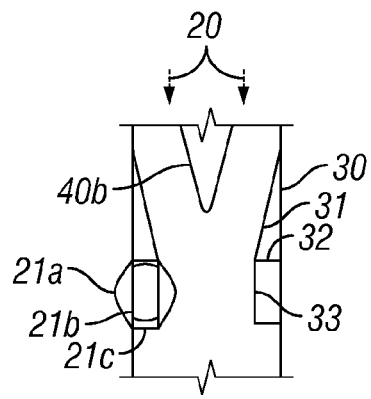
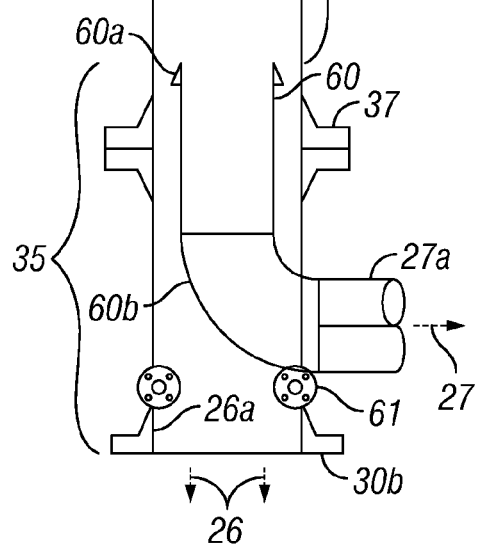
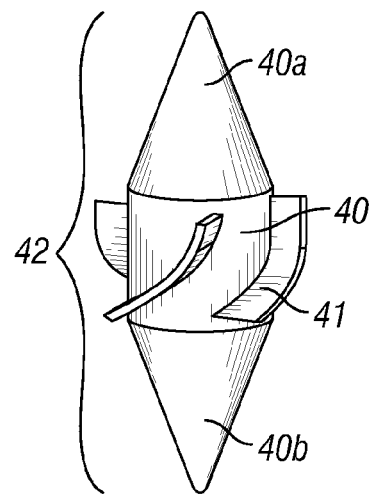
FIG. 2
FIG. 3
FIG. 4
FIG. 5

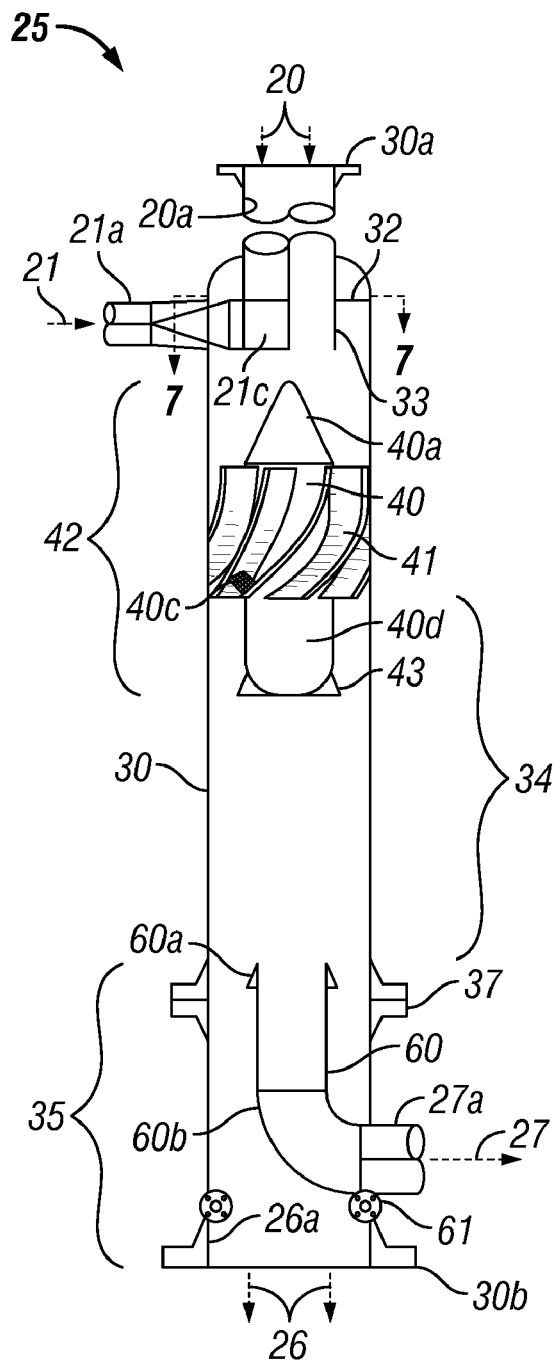
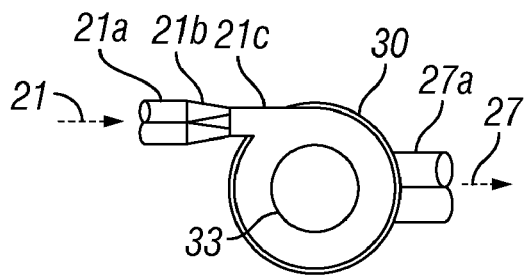
FIG. 7
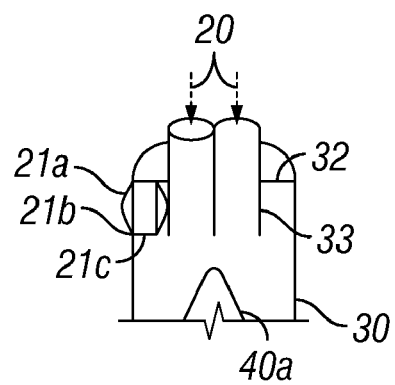
FIG. 8
FIG. 6

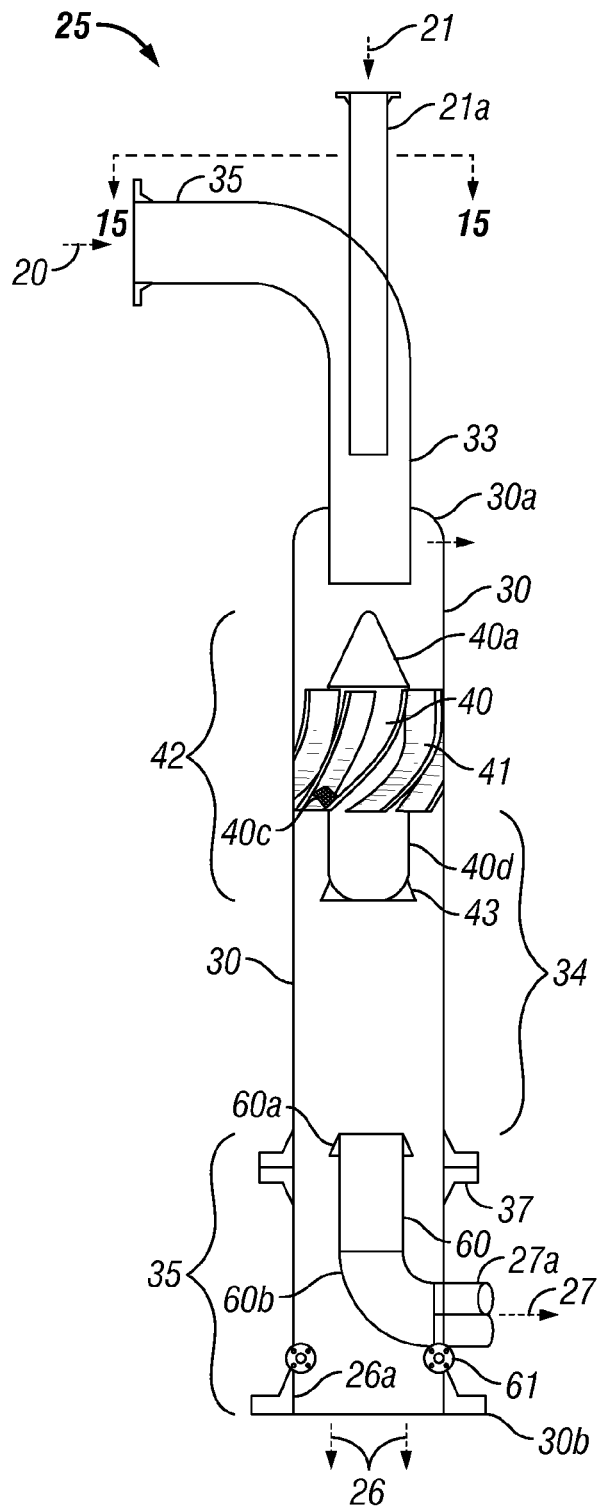
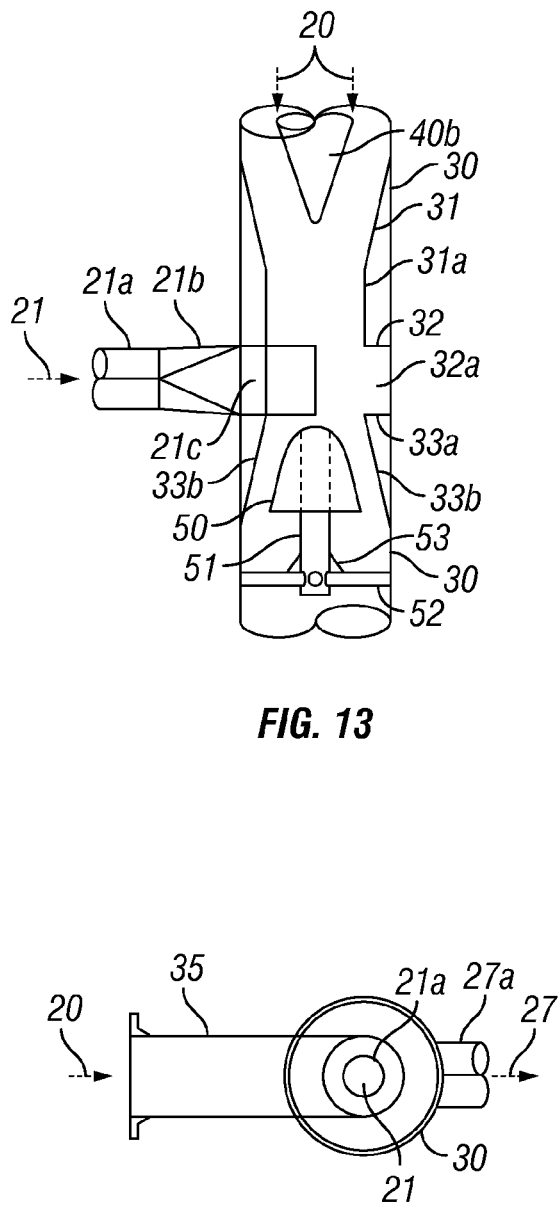
FIG. 13
FIG. 14
FIG. 15

APPARATUS AND METHOD FOR SUPERHEATED VAPOR CONTACTING AND VAPORIZATION OF FEEDSTOCKS CONTAINING HIGH BOILING POINT AND UNVAPORIZABLE FOULANTS IN AN OLEFINS FURNACE

This application is a divisional of application Ser. No. 11/953,678, now U.S. Pat. No. 7,862,651, filed Dec. 10, 2007, which claims the benefit of U.S. Provisional Application No. 60/869,441 filed Dec. 11, 2006.

BACKGROUND OF THE INVENTION

The present invention relates heating hydrocarbon feedstocks and separating them into liquid and vapor fractions. In particular, the invention relates to pre-heating hydrocarbon feedstock materials prior to pyrolyzing the feedstocks. More particularly, the invention relates to contacting and vaporization of hydrocarbon feedstocks for an olefins furnace and the mechanical separation of the liquid and vapor components of the feedstock.

DESCRIPTION OF RELATED ART

The concept of contacting a hydrocarbon feed stream with steam and its subsequent pyrolysis is well established in the literature. Additionally, the concept of using a cyclone or cyclonic-type device to separate a two-phase gas-liquid mixture is also well established in the literature.

In one system, a specially designed centrifugal vapor/liquid separator is employed in furnaces to separate the vapor and liquid components of a flashed mixture of hydrocarbon and steam, such that only the vapor stream is fed and processed further downstream in the radiant tubes of a pyrolysis furnace. (U.S. Pat. No. 6,376,732 B1). The design of the separator ensures that all surfaces in the separator that are prone to coking are well wetted and washed by the non-vaporized liquid portion of the feed.

The vane arrangement disclosed in the '732 patent is designed to provide a very smooth aerodynamic acceleration and spin to the incoming gas/liquid mixture necessary to achieve high separation efficiency and low pressure loss. The vane design is further distinguished by its lack of stagnant zones that would lead to areas of coke deposition. In addition, unlike conventional tangential entry type cyclone separators which typically feature a single, asymmetrical inlet slot or pipe opening, the vane itself is comprised of a series of vane elements or blades which are responsible for imparting a uniform centrifugal force to the incoming gas/liquid mixture along the entire circumference of the inlet section of the vapor/liquid separator.

The high temperature steam and hydrocarbon vapor swirling near the walls within the separation section of the apparatus maintains intimate contact with the oil film on the walls. However, this system is still limited in its ability to vaporize the maximum amount of hydrocarbon feed because of coking concerns in the overall system.

SUMMARY OF THE INVENTION

A specially designed steam-contacting/vaporizing and centrifugal vapor/liquid separating apparatus integrates these two processing functions in a single, compact apparatus for the purposes of: a) contacting and physically vaporizing a hydrocarbon feed stream with high-temperature, superheated steam, b) mechanically separating the resultant liquid and vapors, and c) achieving a high degree of thermal equilibrium between the exiting liquid and steam/vapor phases.

In a preferred embodiment, the invention provides a contactor/separator comprising:
a vessel;
an inlet in said vessel for receiving a vapor/liquid mixture;
an inlet in said vessel for receiving a superheated vapor;
a hub located within said vessel, said hub including a plurality of vanes for imparting a centrifugal motion to one of said vapor/liquid mixture or said superheated vapor;
an outlet in a bottom of said vessel for removing liquid; and
an outlet for removing vapor from said vessel.

In another embodiment, the invention provides a hydrocarbon cracker comprising:
a furnace; and
a contactor/separator comprising:
a vessel;
an inlet in said vessel for receiving a vapor/liquid mixture;
an inlet in said vessel for receiving superheated steam;
a hub located within said vessel, said hub including a plurality of vanes for imparting a centrifugal motion to one of said vapor/liquid mixture or said superheated steam;
an outlet in a bottom of said vessel for removing liquid; and
an outlet for removing vapor from said vessel.

In another embodiment, the invention provides a contactor/separator comprising:
a vessel;
an inlet in said vessel for receiving a vapor/liquid mixture or a liquid;
an inlet in said vessel for receiving a superheated vapor;
a means for imparting a centrifugal motion to at least one of said vapor/liquid mixture, liquid or said superheated vapor;
an outlet in a bottom of said vessel for removing liquid; and
an outlet for removing vapor from said vessel.

In still a further embodiment, the invention provides a method of heating and separating liquid and vapor from a hydrocarbon feedstock comprising:
introducing a hydrocarbon feedstock into a contactor/separator;
introducing a superheated vapor into the contactor/separator such that it contacts and vaporizes a portion of the feedstock within the contactor/separator;
separating unvaporized feedstock from vaporized feedstock in the contactor/separator using centrifugal forces;
removing the vaporized feedstock and the superheated vapor through a first outlet; and
removing the unvaporized feedstock through a second outlet.

In another embodiment, the invention provides a method of heating a feed to a pyrolysis furnace comprising:
preheating a hydrocarbon feed in a convection section of a pyrolysis furnace to form a pre-heated feed;
heating the pre-heated feed with a superheated vapor in a contactor/separator and separating the feed into a vapor fraction and a liquid fraction using centrifugal forces; and
further heating the vapor fraction in the convection section of the furnace.

In another embodiment, the invention provides a method of cracking a hydrocarbon feed containing pitch comprising:
preheating a hydrocarbon feed containing pitch in a convection section of a furnace;
heating the pre-heated feed with a superheated vapor in a contactor/separator and separating the feed into a vapor fraction and a liquid fraction using centrifugal forces;
removing the liquid fraction from the contactor/separator; and cracking the vapor fraction in a radiant section of the furnace.

BRIEF DESCRIPTION OF THE DRAWINGS

FIG. 2 is an elevational view of a contactor/separator according to one embodiment of the invention wherein the feed stream enters through a tangential slot on the side of the apparatus and the steam enters through a vane assembly at the top of the apparatus.

FIG. 3 is a top view of FIG. 2 taken along line A-A.

FIG. 4 is a partial elevational view of FIG. 2 showing the hydrocarbon (feed) inlet section rotated 90 degrees.

FIG. 5 is a perspective drawing of a four-bladed vane assembly of the contactor/separator of FIG. 4.

FIG. 6 is an elevational view of a second embodiment of the present invention wherein both feed and steam enter the apparatus upstream of the vane assembly.

FIG. 7 is a top view of FIG. 6 taken along line A-A.

FIG. 8 is a partial elevational view of FIG. 6 showing the hydrocarbon (feed) inlet section rotated 90 degrees.

FIG. 13 is a partial elevation view of another alternative embodiment of FIG. 9 showing a hyperboloid-shaped insert that can be employed to help direct incoming liquid to the walls of the apparatus.

FIG. 14 is an elevational view of a seventh embodiment of the invention wherein the feed and steam streams enter contactor separator 25 in a co-axial manner ahead of a vane assembly.

FIG. 15 is a top view of FIG. 14 taken along line A-A.

DESCRIPTION OF THE PREFERRED EMBODIMENTS

Figure 1:
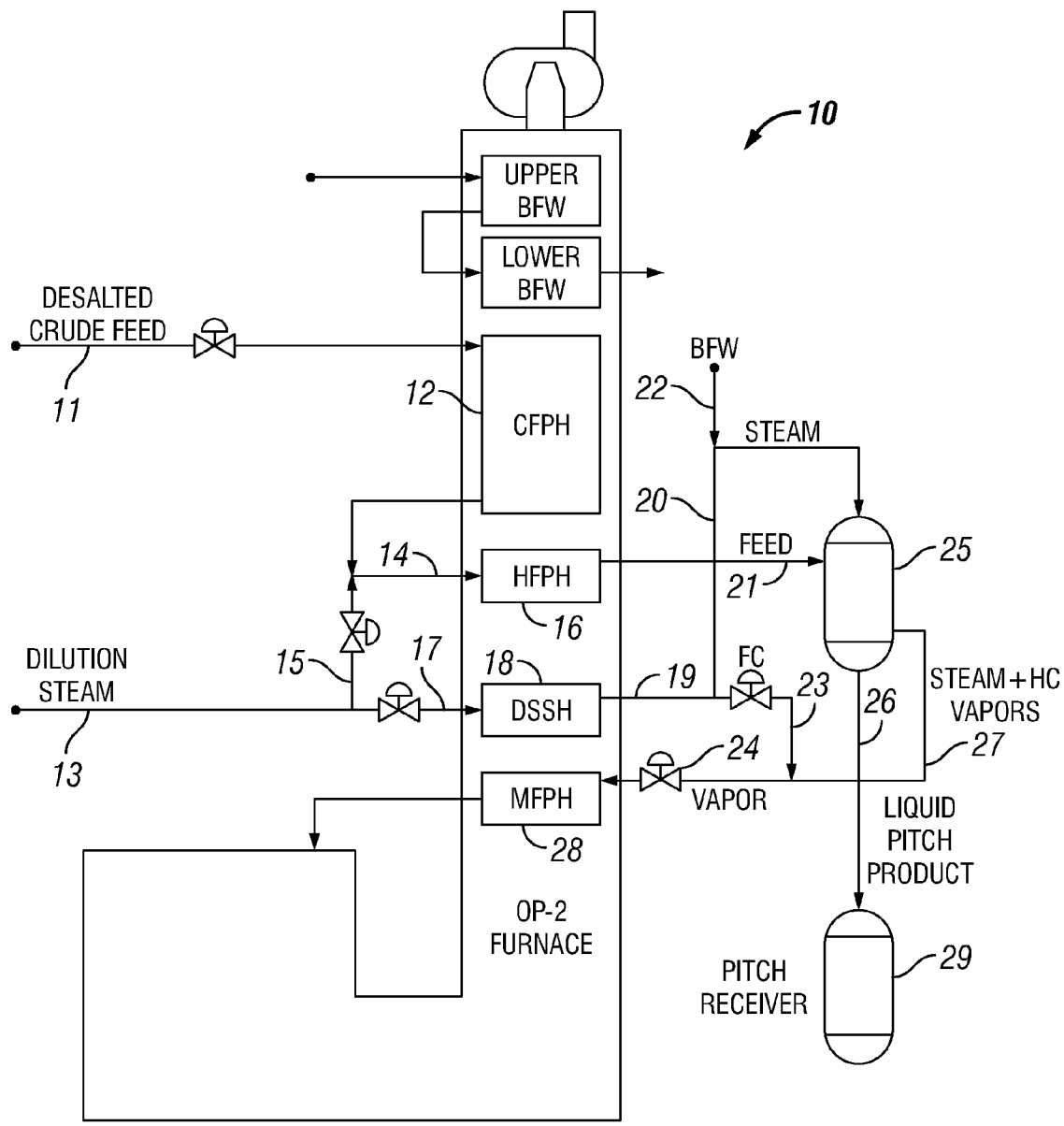
FIG. 1 is a schematic of a flow diagram of the overall process in a pyrolysis furnace that may be used with the instant invention.

Feed as used in this patent description includes feedstock comprising crude oil and/or crude oil fractions containing pitch. This also includes mixtures of lighter crude oil (e.g. condensates) and/or lighter boiling fractions of crude oil fractions (e.g. naphtha, kerosene, and diesel) with heavy hydrocarbon feed. The heavy hydrocarbon feed (i.e. "hydrocarbon feedstock containing undesirable coke precursors") may comprise a range of heavy hydrocarbons. Examples of suitable feedstocks include, but are not limited to, one or more of long and short residues, heavy hydrocarbon streams from refinery processes, vacuum gas oils, heavy gas oil, and crude oil. Other examples include, but are not limited to, deasphalted oil, oils derived from tar sands, oil shale and coal, SMDS (Shell Middle Distillate Synthesis) heavy ends, GTL (Gas to Liquid) process heavy ends, Fischer Tropsch products, all synthesis gas derived hydrocarbons containing high boiling components and hydrocrackate.

Crude oils cannot be completely vaporized under typical olefin furnace convection section conditions. They are normally processed by distillation, and only the lighter, vaporizable fractions from the distillation are used as olefin plant feeds. The feed preparation step of removing heavy ends from the olefins plant feed by distillation requires additional capital and operating cost. The present inventive apparatus and process integrates the vaporization, thermal equilibration, and physical separation of the vapor and liquid streams in a single section of pipe in a manner that avoids the buildup of solid coke deposits and, at the same time, effectively prevents pitch carryover with the hydrocarbon vapor product that is pyrolyzed to produce olefins. "Pitch" as used herein includes petroleum pitch and all other high boiling point heavy end fractions present in a feedstock that contain coke precursors or foulants. Rapid thermal equilibrium is achieved between steam used in the vaporization process and the hydrocarbon products due to intimate contacting of these two phases in the separation section of the apparatus. The instant invention integrates the vaporization, thermal equilibration, and separation steps with the feed pre-heater section of a modified olefins furnace, allowing only the vapor fraction of the heavy feed to enter the cracking zone of the furnace. Furthermore, the ability to flash the hydrocarbon with dilution steam, at a temperature higher than that typically achievable in a vacuum distillation column (750° F.), results in a higher fraction of the crude oil being recovered as olefins plant feed than that recovered through typical atmospheric/vacuum distillation columns used in oil refineries. The present invention thus reduces the yields of the lower value pitch. This is achieved through an integrated steam vaporization and non-coking vapor/liquid separator design according to the instant invention. The vapor/liquid separator can be operated with a range of steam temperatures, e.g., 1000 to 1500° F. (540° C. to 820° C.), with 1200 to 1250° F. (650° C. to 680° C.) being typical. The temperature of the vaporized portion exiting the separator is usually in the range of 800 to 900° F. (430° C. to 480° C.). For a given feed, optimal conditions are determined by acceptable coking rates over a desired temperature range.

The convection section of a typical olefin pyrolysis furnace is modified such that heavy hydrocarbon feeds can be fed directly to the cracking furnace. Heavy hydrocarbon feeds include but are not limited to crude oils, condensates, heavy natural gas liquids, and long and short residues containing heavy tail-end hydrocarbons that cannot be completely vaporized under normal operating conditions achievable in the convection section of an olefins pyrolysis furnace.

Referring now to FIG. 1, which is a schematic view of an ethylene furnace 10, the crude, comprised of a heavy hydrocarbon feed 11 enters through the cold feed pre-heater stage (CFPH) 12 of the convection section of ethylene furnace 10 at a temperature in the range of 80-300° F. (27° C. to 150° C.) with temperatures of ~250-300° F. (~120° C. to 150° C.)

being most commonly applied for feedstocks requiring salt and sediment removal in a desalter located upstream of the furnace.

A small amount of dilution steam 15 from steam supply line 13 is mixed with the hydrocarbon exiting the CFPH prior to feeding the hydrocarbon and steam mixture 14 to the hot feed pre-heater stage (HFPH) 16 of the convection section. The majority of the dilution steam 17 from supply line 13 is fed to the dilution steam super-heater (DSSH) stage 18 of the convention section of furnace 10 where it is heated to about 1250° F. (680° C.). The majority 20 of superheated steam 19 exiting the DSSH enters the top of contactor/separator 25 wherein a vane assembly is employed to impart a strong swirling motion to the incoming steam (or, in one embodiment described below, to help impart a strong rotational flow to the feed and steam streams after they have entered contactor/separator 25.) If necessary or desired, boiler feed water (BFW) 22 or any other source of clean water may be injected into the superheated steam 20 entering contactor/separator 25 for the purpose of controlling the vapor/liquid ratio within the contactor/separator. By "clean water" it is meant that the water should not contain impurities that would be deposited on the downstream equipment and create an equipment fouling problem when the water is vaporized by contact with superheated steam. Hot feed 21 from HFPH 16, at a temperature of about 760° F. (404° C.) and at a pressure of about 85 psig, is also fed to contactor/separator 25 through a tangential inlet and with a directional spin matching that imparted to the incoming steam and wherein the steam and feed are intimately mixed by which action the feed is mostly vaporized. The resultant two-phase vapor/liquid mixture is separated by centrifugal action in the downstream separation section of contactor/separator 25.

The vaporized hydrocarbon and steam fraction 27 is combined with some superheated steam 23 from DSSH, is split into many streams, (passes) with each pass being fed to a valve or other flow controlling device such as shown for one pass, valve 24, and then the passes are fed to the mixed feed pre-heater section (MFPH) 28 of the furnace where they are is heated further and is subsequently fed into the radiant section of the furnace where the hydrocarbon mixture is pyrolyzed at elevated temperatures The non-vaporized liquid fraction (heavy hydrocarbon or "pitch") 26 that is separated from the vaporized hydrocarbon and steam fraction 27 is withdrawn from contactor/separator 25 and collected in pitch receiver 29 (see FIG. 19 for details) prior to being sent to a coker, cat cracker, or other residue-processing unit or units for further processing, or use as fuel. Depending on the composition of the hydrocarbon feed 11, different processing schemes or process conditions may be employed. Pitch receiver 29 may receive pitch from one or more contactor/separators 25. Such an arrangement could for instance be used in furnaces that employ multiple flow controlled parallel feed passes in the convection section. Each feed pass would be equipped with a contactor/separator and the pitch stream from the feed pass contactor/separators could be routed through pressure reduction valves to a common pitch receiver operated at a lower pressure than the contactor/separators.

The operating conditions at the entrance of the contactor/separator 25 are dependent on the hydrocarbon feed 11 properties, with the requirement that there always be enough non-vaporized liquid (between 2-40 vol % of feed, preferably at least 2-5 vol %) to wet the internal surfaces of contactor/separator 25. This wetted wall requirement is essential to prevent the formation of foulants, specifically coke formation, and deposition on the surfaces of contactor/separator 25.

The extent of vaporization (or fraction of non-vaporizable liquid) can be controlled by adjusting the dilution steam/feed ratio and flash temperature of the hydrocarbon/steam mixture 14 entering the hot feed pre-heater (HFPH) 16. It may also be controlled by injecting clean water such as boiler feed water (BFW) 22 into the high temperature superheated steam 20 ahead of contactor/separator 25.

The contactor section of the integrated contactor/separator 25 is designed so that the liquid hydrocarbon contained in the incoming hot feed 21 wets the walls of the apparatus immediately upon entry and prior to contact with superheated steam 20. This arrangement prevents the formation of an "oscillating" wet-dry zone interface wherein the non-vaporizable heavy hydrocarbon liquid could evaporate and form a deposit of solid or semi-solid coke which, if allowed to grow, would eventually shut down the apparatus due either to excessive pressure drop and attendant decrease in feed and/or steam flow rates or to the solid's detrimental effect on the separation. The separating zone of contactor/separator 25 segregates the incoming oil to the inner walls of the separator thereby permitting separation of the liquid and vapor phases of the flash mixture in such a manner that coke solids are not allowed to form and subsequently foul either the contactor/separator 25 or the downstream equipment.

Due to its relatively compact construction and ability to prevent the growth of coke deposits, the wetted-wall contactor/separator design can achieve a higher temperature flash than that in a typical vacuum distillation column. In addition, operation of the process at pressures well above atmospheric pressure makes it insensitive to the small amount of light gases generated by thermal cracking of the feedstock at high temperatures that would normally cause vacuum limitations in a vacuum distillation column. The wetted-wall contactor/separator's operation at relatively high pressure also allows large amounts of a lifting gas such as dilution steam to be used for greatly reducing the partial pressure of high boiling point hydrocarbons in the vapor phase, thus effecting the recovery of a higher vaporized fraction 27 of the feed 11 for further downstream processing. This increases the fraction of hydrocarbon feed 11 that can be used for producing higher valued products exiting the pyrolysis section of the furnace, and reduces the fraction of lower value heavy hydrocarbon liquid fraction 26.

A first embodiment of contactor/separator 25 is shown in FIGS. 2, 3, 4, and 5. Referring now to FIGS. 2 and 3, contactor/separator 25 is shown in a vertical, sectional view in FIG. 2 and in a top view in FIG. 3. The contactor/separator 25 comprises a cylindrically shaped vessel or pipe section having body housing 30, a tangentially affixed inlet 21a for receiving the incoming two-phase hot feed 21, an inlet 20a for receiving incoming steam 20, a vapor outlet 27a for directing vaporized fraction 27 to the MFPH section 28 of furnace 10, and a liquid outlet 26a for directing liquid fraction 26 to the pitch receiver.

Closely spaced from the inlet 20a is a "vane assembly" 42 comprised, in part, of a cylindrically shaped hub 40 having at its proximal end a nose cone 40a and at its distal end a trailing edge nose cone 40b. The hub 40 contains a plurality of vanes 41 symmetrically spaced around the circumference of the hub 40 comprising, along with the nose cones 40a and 40b, what is herein called the "vane assembly" 42. One embodiment of the vane assembly is shown more clearly in the perspective view of FIG. 5.

Vane assembly 42 may be constructed, in part, from two or more overlapping vanes 41. In the preferred embodiment of the instant invention, the individual vanes 41 are designed such that their leading or proximal end is curved upwards in order to provide a smooth flow transition for the vapors entering the proximal end of the elements. The proximal edge of the elements should be radiused in order to provide an even smoother flow transition. Downstream of the upper, curved section of each vane 41 is, in the preferred embodiment, a constant-angle, helical section that comprises the remainder of the element. For the instant invention this helical section of the element forms an angle of 30° relative to the horizontal or relative to a plane that intersects the major axis of contactor/separator 25 at a right angle. Other angles, including angles within the range 10° to 60°, are also possible. Smaller angles impart more spin to the incoming vapors 20 but less flow capacity for a given throat velocity and outer vane diameter. Larger angles impart less spin but greater flow capacity for a given throat velocity and outer vane diameter. The distal end of each vanes 41 should overlap the distal end of an adjacent element by at least 30° in order to ensure that the vapors exiting vane assembly 42 do so at the same (or nearly the same) angle that the distal end of the blade elements form with the horizontal.

The nosecones should have the same base diameter as hub 40 and should have, in the preferred embodiment, a height of about 1⅓ times that of their base diameter. Other height-to-diameter ratios are possible but they should normally lie in the range 0.5 to 2.0. Nosecone 40a helps provide a smooth transition for vapors entering vane assembly 42. Nosecone 40b, together with conical section 31, prevents the vapors that exit vane assembly 42 from experiencing gross flow separation and the attendant generation of flow eddies. The nosecones shown in FIG. 2 are identical in size and shape but other options are possible. For example, nosecone 40a may be constructed in the form of a hemisphere and still achieve its primary purpose of providing a smooth flow transition for the vapors entering vane assembly 42.

As shown in FIGS. 2, 3 and 4 incoming hydrocarbon feed 21 enters an annular space within housing 30 tangentially through inlet 21a, followed by round-to-rectangular transition section 21b, followed by rectangular duct 21c. The annular space is formed by the inner walls of the housing, the outer walls of "isolation cylinder" 33, and by the circular roof section 32. The feed enters with sufficient velocity and flow rate for the liquid phase to completely wet the inner walls of the housing in the vicinity of its entrance.

Superheated steam 20 enters the top of housing 30 through steam inlet 20a and then passes through the aforementioned vane assembly wherein it is imparted a strong swirl in the same rotational direction as that imparted to the feed that enters housing 30 via entrance sections 21a, 21b and 21c. The steam next flows in a spiraling fashion through a converging section of ducting 31, through isolation cylinder 33, and then into the cylindrically-shaped contacting and separation section indicated by the dashed line labeled 34 in FIG. 2. The steam exiting the isolation cylinder 33 contacts the hydrocarbon liquid fraction of the feed 21 immediately below the isolation cylinder 33, reinforcing the existing spin that feed 21 acquired upon its tangential entrance into housing 30, and proceeds to vaporize the volatile fraction of feed 21 over the length of contacting and separation section 34 of housing 30. Due to the spin imparted to the fluid mixture entering contactor/separator 25, essentially all of the liquid in the separator is disengaged from the vapor and deposited on the wall of the cyclone, and all vapors in incoming feed 21, together with the vaporizable portion of the feed 21, together with steam 20 that entered housing 30, exits housing 30 through vortex tube 60, exit bend 60b, and vapor outlet 27a as a mixed vaporized fraction 27 free, or essentially free, of hydrocarbon liquid.

The vaporized fraction 27 proceeds to the mixed feed preheater (MFPH) section 28 of the pyrolysis furnace for further heating prior to entering the radiant section of the furnace, as shown in FIG. 1. In the event any liquid film were to deposit on the outer walls of vortex tube 60, conical skirt 60a, which surrounds the entrance to the vortex tube 60, aids in deflecting the liquid outwardly toward the separator walls of housing 30, thereby preventing any liquid from entering the vortex tube 60.

Non-vaporizable hydrocarbon liquid that enters contactor/separator 25 is transported downward, in a spiral-like manner, along the walls of the contactor/separator 25. Such downward flow of liquid along the inner walls of contactor/separator 25 occurs under the influence of downwardly directed convection forces that exist near the inner walls of the contactor/separator, and that are typical of the convective forces that exist, in general, in all cyclonic devices, and as a result of gravitational forces acting on the liquid. As the liquid phase is transported downward, it maintains the walls of the contactor/separator 25 in a washed, wetted state and thereby prevents the formation of coke deposits on the walls. The liquid exits vapor/liquid separator 25 through liquid outlet 26a. A small, recycled portion (not shown) of liquid fraction 26, exiting contactor/separator 25, may be pressurized via a pump and injected into the lower section of contactor/separator 25, if necessary, to assist in maintaining the walls 34 of contactor/separator 25 in a wetted state. In addition, a set of inlet nozzles 61 may be provided below vapor outlet 27a, if needed, to provide quench oil to cool collected liquid 26 and reduce downstream coke formation. Such recycling of liquid is normally not required but can be useful when processing feedstocks having a low pitch content which are not capable of adequately irrigating the walls of the equipment to prevent coke formation. Furthermore, steam may be injected in the upper section of pitch receiver 29 for the purpose of isolating vapors in contactor/separator vessel 25 from the pitch receiver. As shown in FIG. 2, contactor/separator 25 may be equipped with one or more body flanges 30a, 30b and 37 to accommodate field construction and routine inspection or maintenance during unit turnarounds.

A second embodiment of the design is shown in FIGS. 6, 7 and 8. Here, the feed 21 enters contacting/separating apparatus 25 above vane assembly 42. In addition, hub 40 is extended below the distal end of vanes 41 to form extended hub section 40d. A flared, skirt-like conical section 43 is affixed to the distal end of the extended hub section 40d. The purpose of sections 40d and 43 is to prevent any liquid film that may flow down the walls of the hub from dripping off the hub and dropping down into vortex tube 60, thereby entering the pyrolysis section of the furnace via the mixed feed preheater (MFPH). Relative to the first design embodiment shown in FIGS. 2 through 5, this design provides some additional contact and equilibration between the feed and steam phases as a result of their mutual passage through the vane assembly. It is important, however, to design the angle of the leading edge of the vanes 41 so that their angle of inclination relative to the horizontal matches as closely as possible the angle of inclination of the liquid spiraling down the upper section of housing 30 just ahead of the vane elements. Other than these differences, the design revealed in this second embodiment is functionally identical to the first embodiment shown in FIGS. 2 through 5.

Figure 9:
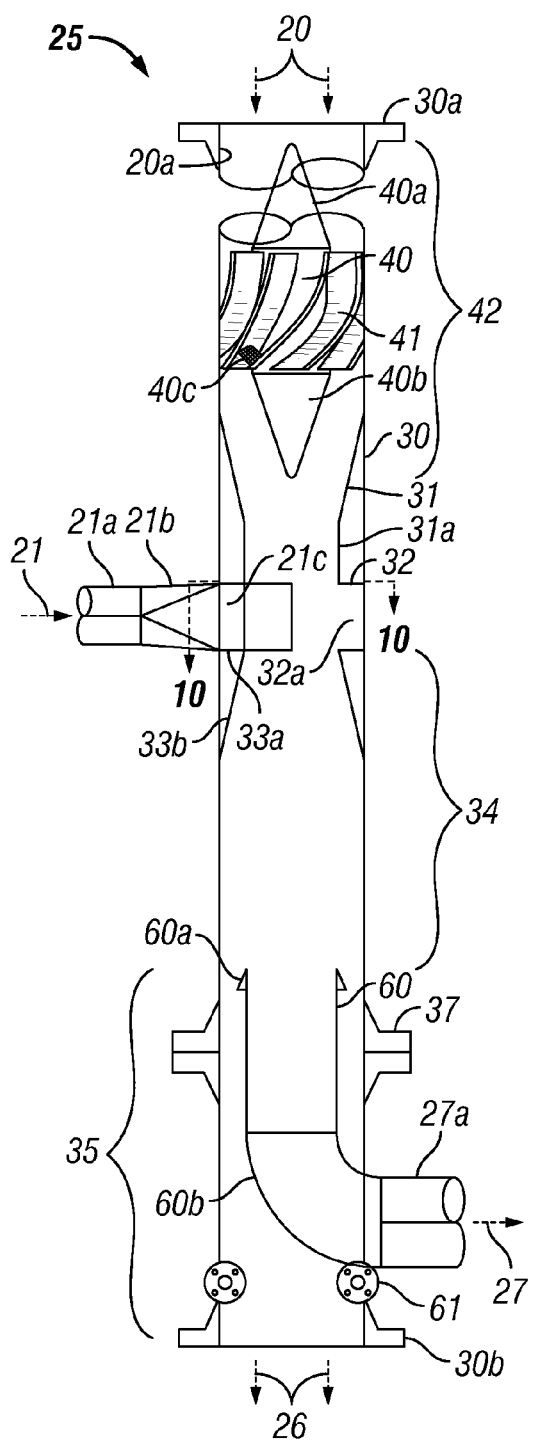
FIG. 9 is an elevational view of a third embodiment of the invention wherein the feed stream enters a circular inlet well for improved liquid distribution and steam contacting.
Figure 10:
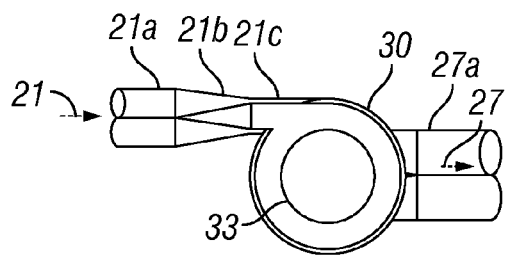
FIG. 10 is a top view of FIG. 9 taken along line A-A.
Figure 11:
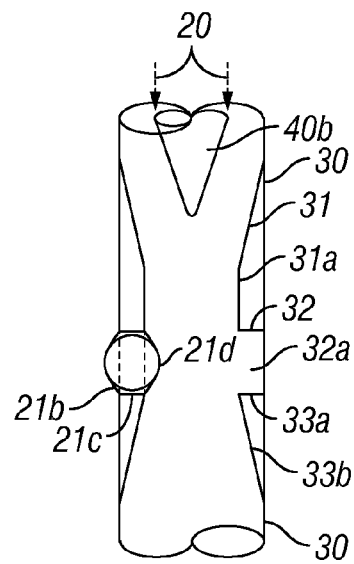
FIG. 11 is a partial elevational view of FIG. 9 showing the hydrocarbon (feed) inlet section rotated 90 degrees.

A third embodiment of the design is shown in FIGS. 9 through 11. This design is essentially identical to the first design embodiment shown in FIGS. 2 through 5 with the exception of a circular "holdup" chamber 32a and exit diffuser 33b. Holdup chamber 32a is comprised of roof section 32, housing 30 and ledge 33a. Chamber 32a forces the tangentially entering liquid contained in the feed 21 into a spinning liquid ring within its confines. The liquid exits the chamber in a more uniform manner compared to a design that does not contain such a chamber. As such, the chamber functions much like a tangential entry spray nozzle, only the liquid phase in the instant design is not atomized, rather it exits the chamber as a conical sheet of liquid. Diffuser 33b is included to gently direct the conical liquid film to the walls 30 of the apparatus and also to reduce the pressure drop across the chamber. Other than these differences, the design revealed in this third embodiment is functionally identical to the first embodiment shown in FIGS. 2 through 5.

Figure 12:
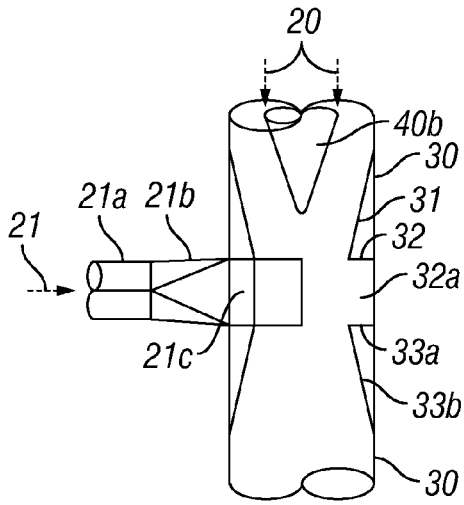
FIG. 12 is a partial elevation view of an alternative embodiment of FIG. 9 shown without the cylindrical section of steam piping located immediately upstream of where feed enters the apparatus.

A fourth embodiment of the design is shown in FIG. 12. This design shares the same features as those found in the third design embodiment except, in this case, the cylindrical section of pipe 31a connecting converging section 31 (downstream of vane elements 41) to the aforementioned holdup chamber 32a, is absent. This provides for a somewhat simpler and more compact design (lengthwise). Otherwise, this fourth embodiment of the design is functionally identical to the third embodiment shown in FIGS. 9, 10 and 11.

A fifth embodiment of the design is shown in FIG. 13. This design is identical to that shown in FIGS. 9, 10 and 11 (i.e., the third embodiment) except that a hyperboloid (or similarly) shaped diffuser 50 is inserted within exit diffuser 33b for the purpose of helping to direct all liquid exiting holdup chamber 32a to the walls of housing 30. The diffuser may be affixed to housing 30 via a cross brace 52 and central support column 51. Braces 53 help stabilize column 51 on cross brace 52. Other means of support are also possible. The diffuser shown in FIG. 13 may also be combined with the design shown in FIG. 12. Such a diffuser is also useful during off-design conditions such as during startup and shutdown as its position prevents liquid from the feed inlet from directly dripping downward into the vapor outlet tube of the contactor/separator.

A sixth embodiment of the design interchanges feed stream 21 and steam stream 20 so that the feed stream enters inlet 20a and the steam enters inlet 21a. While this embodiment can be applied to any of the apparatus shown in FIGS. 2 through 15, it is especially applicable in generating a uniform liquid film through sections 31, 33 and 34 of the design revealed in FIG. 2.

A seventh embodiment of the design has both the feed stream 21 and steam stream 20 entering coaxially ahead of inlet vane assembly 42, as shown in elevation view, FIG. 14, and in top view, FIG. 15. This design is similar to embodiment two shown in FIGS. 6, 7, and 8 in that it provides some additional contact and equilibration between the feed and steam phases as a result of their mutual passage through the vane assembly. Preferably, the feed stream would enter inlet 21a while the steam stream would enter inlet 35. Alternatively, the feed stream could enter inlet 35 while the steam stream enters inlet 21a. The former inlet assignment is preferred, however, since this arrangement forces the incoming liquid fraction of the feed to impact nosecone 40a, thereby improving the distribution of liquid through the vane assembly. This seventh embodiment is the simplest to fabricate since it eliminates the more complex tangential side entry. It also provides for a more uniform distribution of the feed stream (which would normally enter through the tangential, round-to-rectangular inlet chute 21a, 21b, and 21c).

Figures 16, 17:
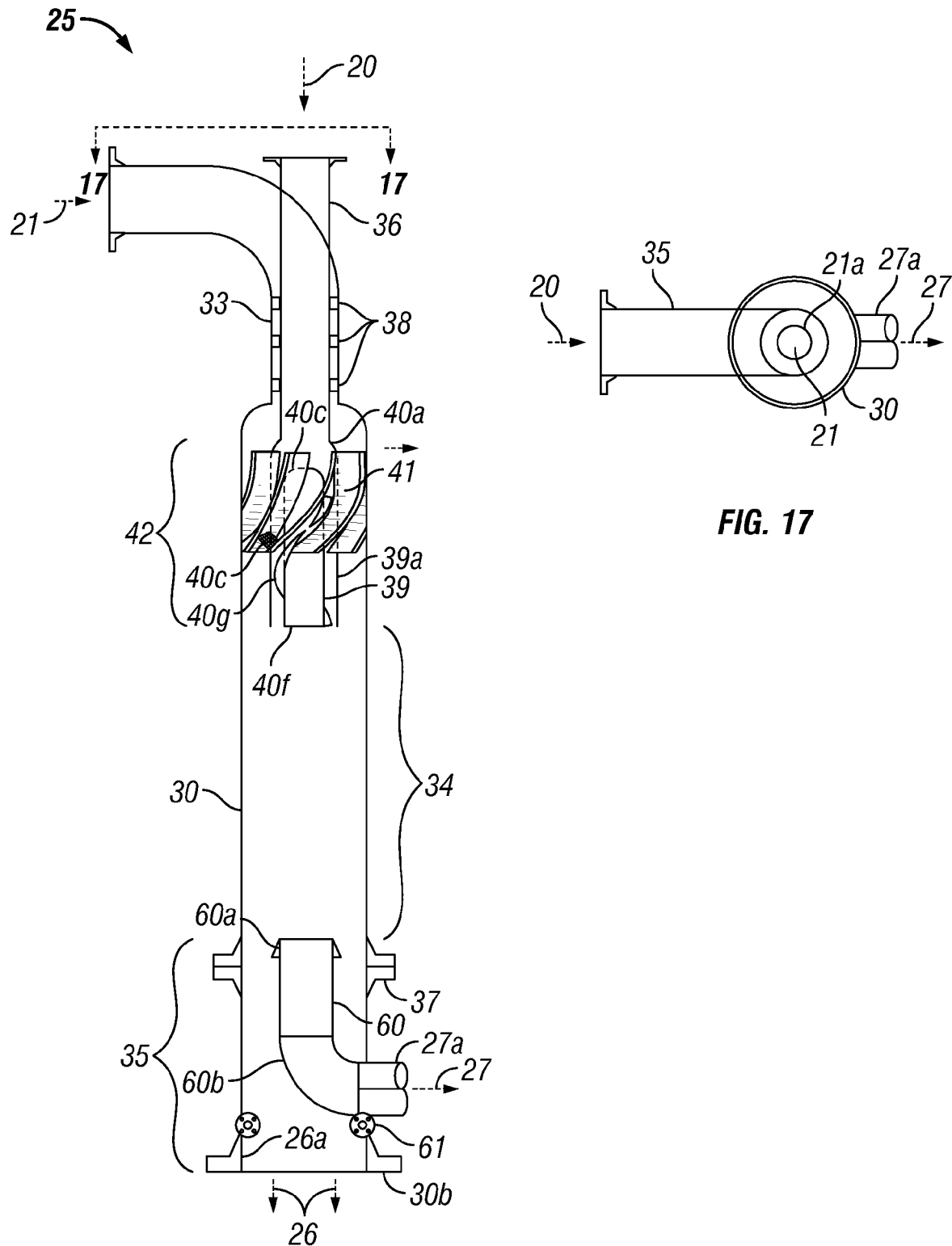
FIG. 16 is an elevational view of an eighth embodiment of the invention with coaxially entering feed and steam streams to which a spin is separately imparted and wherein the streams are not allowed to mix until the steam stream exits the inner vane element.
FIG. 17 is a top view of FIG. 16 taken along line A-A.

An eighth embodiment of the design also has both the feed stream 21 and steam 20 entering coaxially ahead of inlet vane assembly 42, as shown in elevation view, FIG. 16, and in top view, FIG. 17. In this design the feed 21 enters the apparatus through an annulus formed between the inner walls of feed pipe 35 and the outer walls of steam pipe 36. Within this annulus one or more flow distribution or "straightening" vanes (or tabs) 38 may be employed, if necessary, to promote uniform distribution of the feed stream ahead of vane assembly 42.

After exiting the coaxial feed and steam pipes the feed is subjected to strong centrifugal forces generated by its passage through vane assembly 42, having vanes 41. The steam stream exits the coaxial pipes and enters the annulus of a coaxial section of pipe formed by the inner walls of feed vane hub 39a and the outer walls of a closed section of inner pipe 39, referred to herein as the "inner vane hub". In the preferred embodiment, inner pipe 39 is sealed at its distal end with disk 40f, and at its proximal end with a rounded end cap 40e. The end cap could take the form of a standard pipe cap or a specially designed nosecone in order to reduce the pressure drop of the steam phase and to provide a more uniform steam flow pattern downstream of the cap. Optionally, the distal end of the inner hub may be left open. A helical ribbon or vane assembly 40g is employed to impart a strong centrifugal force or spin to the steam. The vane is designed so that the steam's rotational direction is the same as that imposed by vanes 41 on the feed stream.

With this particular embodiment of the design, the feed and steam streams do not contact one another until they cross through an imaginary horizontal plane that passes through inner hub bottom plate 40f. This design limits the wet-dry surface contact between the incoming two-phase feed and incoming steam vapor to a circular ring defined by the outer edge of pipe 39 at its distal end. In so doing, it prevents a "wandering" interface between the hot steam and feed phases which, in turn, eliminates the possibility of wall or surface coke formation where these two streams first contact one another. As with the other design embodiments described above, following their initial contact, the steam and feed phases thermally equilibrate within separation zone 34; the unvaporized pitch phase 26 is centrifuged to the walls of the separator and exits through liquid outlet 26a. The mixed steam and vaporized feed phase exits out vortex tube 60.

Depending on feed composition, operating temperature, and flow conditions, it may be necessary to thermally insulate the feed stream from the steam prior to their plane of contact, mentioned above. The purpose of such insulation would be to prevent coking in feed pipe 35, and/or on hub 39a. Insulation could be achieved by "double-walling" the feed pipe and hub to reduce the conductive and convective heat transfer rate between the steam and feed streams prior to contact of the feed with "live" steam.

This eighth embodiment eliminates the need to cut a rectangular opening in the cylindrical walls of housing 30 of contactor/separator 25, thereby simplifying its construction. It also provides a more uniform distribution of the incoming oil along the walls 30 of contactor/separator 25 than that which would normally result from a simple rectangular entry duct without any special internals to improve the liquid's flow distribution.

Although the focus thus far has been on a single contactor/separator, it is understood that situations may occur wherein more than one such unit may be installed in parallel. This could occur for a variety of reasons:
 1. To reduce the size of the separation apparatus for better mechanical/thermal robustness
 2. To handle exceptionally high feed and steam rates
 3. To improve the separation "cut-point" diameter and overall pitch collection efficiency 4. To reduce overall pressure loss for a given total feed and steam rate
5. To allow one or more units to be taken off-stream for maintenance while one or more other units remain on-stream
6. To better accommodate variations in feed and steam rates due to changes in process conditions and/or crudes
7. To allow contactor/separators to be installed in parallel feed passes commonly used in many ethylene furnace designs. In such designs each feed pass is separately flow controlled and apportioned an equal fraction of the total feedstock flowrate to the furnace. Accordingly, for such a furnace having 6 feed passes, 6 contactor/separators would be installed.

Figure 18:
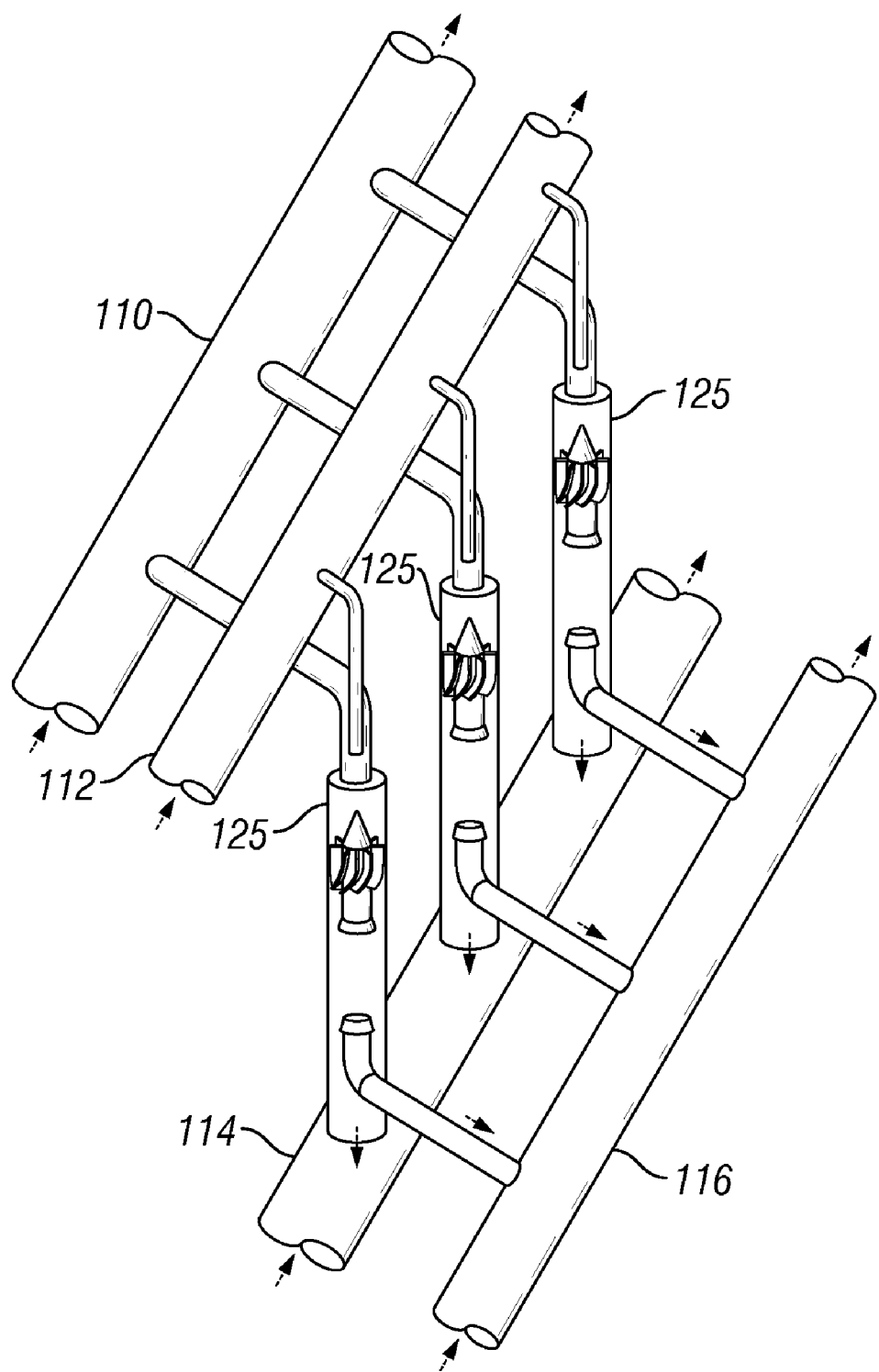
FIG. 18 is a simple isometric drawing illustrating a parallel arrangement of a plurality of contactor/separator units with separate feed, steam, pitch and vapor outlet headers.

FIG. 18 illustrates one of several possible ways of arranging a parallel bank of contactor/separator units 125. Herein, pipe headers 110 and 112 are used to supply steam and feed to the inlets of units 125 respectively. Similarly, pipe headers 114 and 116 are used to remove the pitch and vapor fractions. Although FIG. 18 illustrates the use of contactor/separator design embodiment number seven, described above, it should be clear that any of the embodiments described in this application could be arranged and operated in parallel. The key to successful operation of such a parallel bank of contactor/separation units is proper manifold design. This includes keeping the pressure drop across the headers small in comparison to the pressure drop across the individual contactor/separation units. It also includes arranging the piping so that the same quantity and ratio of feed and steam report to each of the individual separation units.

Figure 19:
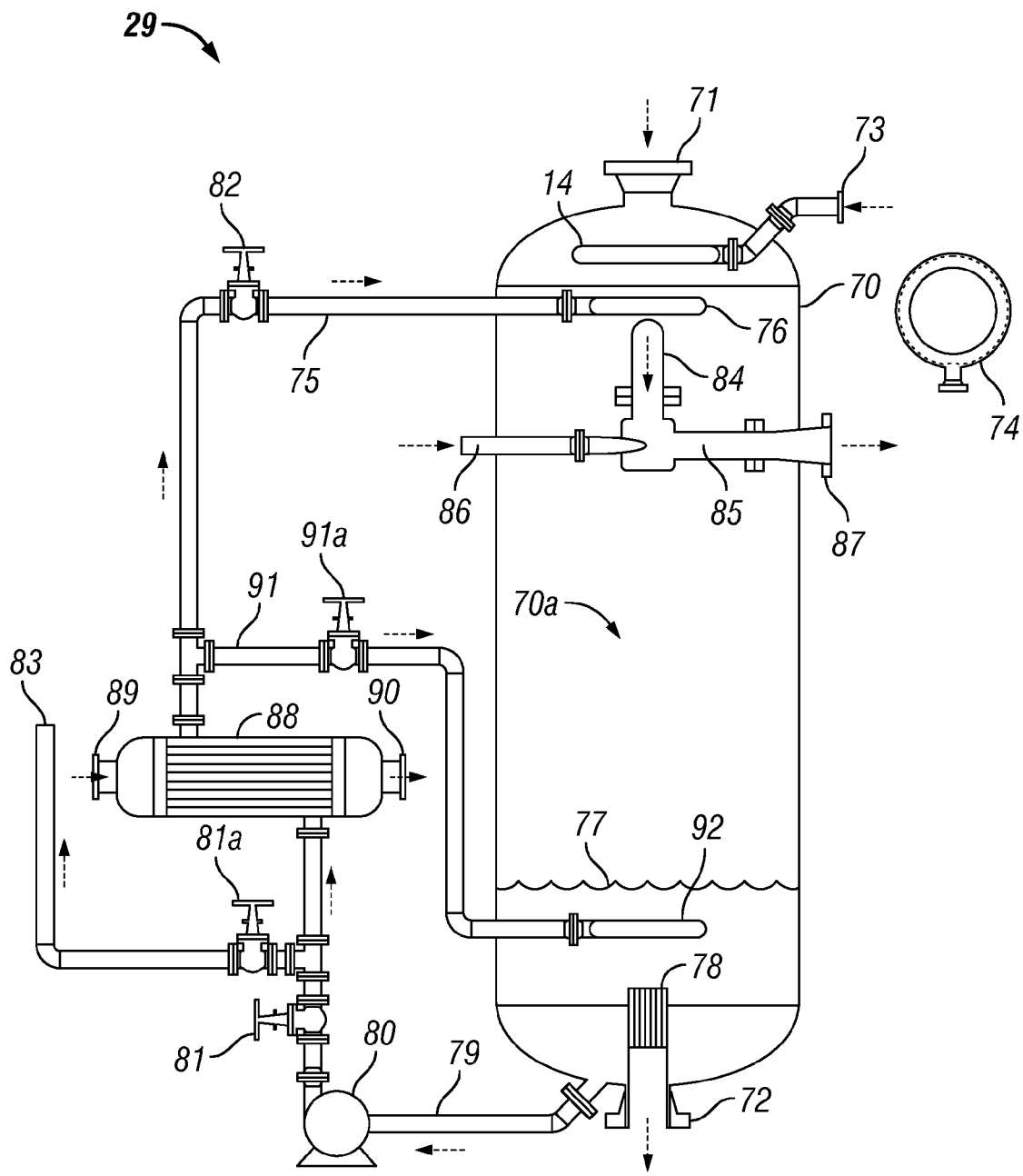
FIG. 19 is an elevation view of a pitch receiver showing a) two pitch recycle methods that may be used to reduce coke deposits when processing feedstocks with an unusually large amount of coke precursors and, b) the use of a vacuum jet ejector to improve the recovery of hydrocarbons from the pitch phase.

Referring now to FIG. 19, liquid pitch 77 collected in pitch receiver 29 may be cooled by passage through heat-exchanger 88, re-circulated by means of pump 80, and sprayed or otherwise distributed by means of liquid distributor 76 on the upper walls 70 of the receiver for wetting, if necessary. The cooled pitch may also enter through two or more tangential nozzles (not shown) affixed to the inside walls of receiver 29 just below steam ring 74 for the purpose of wetting the walls of the receiver, if necessary. In addition, cooled pitch 91 also may be recycled through a distribution ring 92 below the level of liquid pitch 77 in pitch receiver 29. Furthermore, some pitch 83 may be re-circulated back to contactor/separator 25 to assist in cooling and maintaining the walls of the contactor/separator in a wetted state, if necessary. A separate hot pitch pump (not shown) may be used for recycling hot pitch from the bottom of the contactor/separator back to the separating zone of the contactor/separator to ensure wetted walls.

In addition, steam 73 may be injected into the upper section of pitch receiver 29 by means of a steam ring 74 in order to form a steam barrier between contactor/separator 25 and the pitch 77 collected in pitch receiver 29. By decoupling the pitch from any entrained hydrocarbon vapors that may otherwise enter the receiver, it is possible to prevent higher temperature hydrocarbon vapors present in the cyclone from flowing downward and condensing on the colder liquid in the pitch receiver.

A steam-driven vacuum jet ejector 85 having suction inlet 84, steam inlet 86 and discharge nozzle 87, may be installed in pitch receiver 29 to reduce the pressure within the vapor phase 70a of the receiver for the purpose of increasing the recovery of hydrocarbon components suitable for feed to an olefins plant. Although not shown in the drawing, to permit the installation of the vacuum jet, the vapor space of the contactor/separator is isolated from the vapor space of the pitch receiver below it by mechanical means allowing them to be operated at two different pressures. Isolation can be achieved by any means that allows pitch to freely flow from the contactor/separator to the pitch receiver.

While the invention has been described with respect to the presently preferred embodiments, it will be appreciated that changes can be made and still come within the scope of the invention. For example, multiple contactor/separators can be used in parallel in conjunction with a single furnace. They could each be connected to a separate pass through the furnace or could each process a portion of a single pass. Additionally, multiple tangential feed inlets could be used in a single contactor/separator. Further, the vessel can be cylindrical as illustrated in the preferred embodiments or it can be conical since both use centrifugal forces to separate the vapor and liquid.

What is claimed is:

1. A method of heating and separating liquid and vapor from a hydrocarbon feedstock comprising:
   introducing a hydrocarbon feedstock into a contactor/separator through a first inlet:
   introducing a superheated vapor into the contactor/separator such that it contacts and vaporizes a portion of the feedstock within the contactor/separator through a second inlet;
   separating unvaporized feedstock from vaporized feedstock in the contactor/separator using centrifugal forces in a separation zone;
   removing the vaporized feedstock and the superheated vapor through a first outlet positioned below the separation zone; and
   removing the unvaporized feedstock through a second outlet.

2. A method of heating and separating liquid and vapor from a hydrocarbon feedstock as defined in claim 1 wherein the superheated vapor comprises steam.

3. A method of heating and separating liquid and vapor from a hydrocarbon feedstock as defined in claim 1 wherein the superheated vapor comprises a steam and hydrocarbon mixture.

4. A method of heating and separating liquid and vapor from a hydrocarbon feedstock as defined in claim 1 wherein the feedstock is heated and partially vaporized before being introduced into the contactor/separator.

5. A method of heating and separating liquid and vapor from a hydrocarbon feedstock as defined in claim 1 wherein the hydrocarbon feedstock is vaporized at a temperature greater than 750° F. (400° C.).

6. A method of heating and separating liquid and vapor from a hydrocarbon feedstock as defined in claim 1 wherein the hydrocarbon feedstock is vaporized at a temperature between 760 and 950° F. (404° C. and 520° C.).

7. A method of heating and separating liquid and vapor from a hydrocarbon feedstock as defined in claim 1 wherein the hydrocarbon feedstock comprises crude oil, crude oil fractions, heavy hydrocarbon feeds, gas to liquid process heavy ends, Shell Middle Distillate Synthesis heavy ends, deasphalted oil, oils derived from tar sands, oil shale and coal, Fischer Tropsch products, or hydrocrackate.

8. A method of heating and separating liquid and vapor from a hydrocarbon feedstock as defined in claim 1 wherein at least 2 vol. % of the feedstock remains as liquid.

9. A method of heating and separating liquid and vapor from a hydrocarbon feedstock as defined in claim 1 wherein sufficient feedstock remains as liquid to wet the interior surfaces of the contactor/separator to prevent or reduce coking.

10. A method of heating and separating liquid and vapor from a hydrocarbon feedstock as defined in claim 1 wherein the separated vaporized feedstock and superheated vapor are fed to a pyrolysis furnace.

11. A method of heating and separating liquid and vapor from a hydrocarbon feedstock as defined in claim 1 wherein the temperature in the contactor/separator is controlled by adjusting the temperature of the superheated vapor.

12. A method of heating and separating liquid and vapor from a hydrocarbon feedstock as defined in claim 1 the temperature in the contactor/separator is controlled by adjusting the amount of superheated vapor fed to the contactor/separator.

13. A method of heating and separating liquid and vapor from a hydrocarbon feedstock as defined in claim 1 wherein the temperature in the contactor/separator is controlled by adjusting the temperature of the hydrocarbon feed fed to the contactor/separator.

14. A method of heating a feed to a pyrolysis furnace comprising:
    preheating a hydrocarbon feed in a convection section of a pyrolysis furnace to form a pre-heated feed;
    heating the pre-heated feed with a superheated vapor in a contactor/separator and separating the feed into a vapor fraction and a liquid fraction using centrifugal forces in a separation zone;
    removing the vapor fraction through an outlet positioned below the separation zone; and
    further heating the vapor fraction in the convection section of the furnace.

15. The method of claim 14 wherein the hydrocarbon feed includes pitch.

16. The method of claim 15 further comprising removing the pitch from the contactor/separator.

17. A method of cracking a hydrocarbon feed containing pitch comprising:
    preheating a hydrocarbon feed containing pitch in a convection section of a furnace;
    heating the pre-heated feed with a superheated vapor in a contactor/separator and separating the feed into a vapor fraction and a liquid fraction using centrifugal forces in a separation zone;
    removing the vapor fraction through an outlet positioned below the separation zone;
    removing the liquid fraction from the contactor/separator; and
    cracking the vapor fraction in a radiant section of the furnace.

* * * * *